May 12, 1931.  J. H. REEDY  1,804,810
PACKING BOX
Filed April 25, 1928
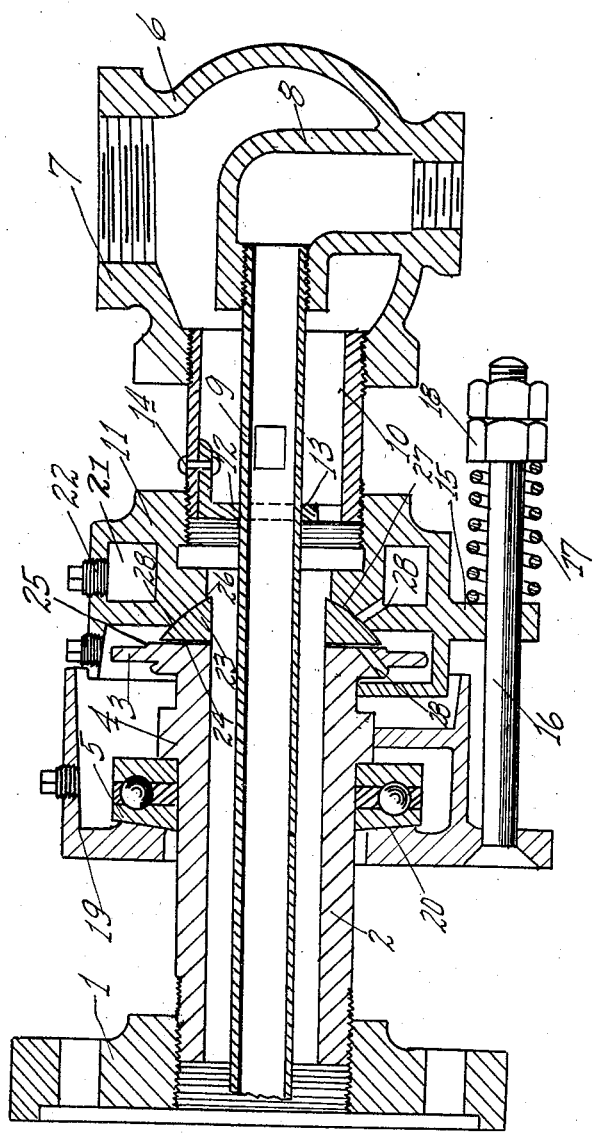
INVENTOR.
John H. Reedy
BY
Allen & Allen
ATTORNEY.

Patented May 12, 1931

1,804,810

UNITED STATES PATENT OFFICE

JOHN H. REEDY, OF HAMILTON, OHIO, ASSIGNOR OF ONE-HALF TO ALBERT O. ROLFE, OF HAMILTON, OHIO

PACKING BOX

Application filed April 25, 1928. Serial No. 272,844.

My invention relates to packing boxes and particularly to packing boxes for pipe swiveling connections. In the Patent #1,129,815 of Feb. 23, 1915, a pipe swivel is disclosed for use with a stationary pipe element and a rotary pipe element in connection therewith in which the two pipe elements may not be in perfect alignment each with the other, due ordinarily to disturbances brought about by the operation of the machine in connection with which the swivel is employed. In the aforementioned patent the swivel is employed in connection with a rotator drying cylinder in a paper making machine in which the drying cylinder may rise from its normal position due to the wrapping around it of several layers of paper accumulating from a broken web. Such an occurrence elevates the axis of the drying cylinder above the axis of the pipe which supplies it with steam, thereby causing misalignment of the rotator and stationary pipe.

It is the object of my invention to provide improvements in this type of structure which improvements will provide a more serviceable leak proof joint.

The above and other objects to which reference will be made in the ensuing disclosure I accomplish by that certain combination and arrangement of parts of which I have illustrated a preferred modification.

Referring to the drawing:

The figure represents a sectional view of my improved packing box. I have indicated at 1, a flange secured to the neck of a rotary machine element to which steam or other fluid or liquid is to be supplied through an actual passage way in the neck. I have indicated at 2, a pipe having its inner end threaded within the flange and with a flanged face 3 at its outer end. The pipe 2 further has annular shoulders thereon as indicated at 4, to retain a thrust ball bearing assembly indicated at 5. Steam or other liquid is supplied through the pipe 2 from an elbow 6, the steam entering through the threaded aperture 7.

Within the elbow is a reduced elbow 8 in which is threaded a pipe 9 of smaller diameter than the pipe 2. The pipe 9 may be utilized for siphoning the exhaust from the rotary machine element. A short section of pipe 10 connects the elbow 6 with a hub like retaining ring 11 within which the pipe 9 may be threaded. As a support for the pipe 9 within the pipe 10 I have further shown the supporting flange 12 having an aperture 13 therein, through which the pipe 9 extends. The supporting flange 12 may be secured within the pipe 9 as by a copper rivet indicated at 14.

As in Patent #1,129,815, the hub like retaining ring 11 has lugs 15 thereon through which bolts 16 extend. The bolts 16 are held by means of springs 17 and nuts 18 threaded on the ends of the bolts. The springs also act as a safety appliance and can be set for any amount of pressure. When the pressure goes beyond the set pressure the springs will open up allowing steam to blow through the packing box. For retaining the ball bearing race in position, a cup-shaped housing 19 is mounted around the pipe. The housing 19 has an annular shoulder 20 which bears against the outer surface of the ball bearing race, the inner surface being provided by the shoulder 4 on the pipe 2.

It will further be obvious that relative movement of the pipe 2 and the pipe 9 may be compensated for by the aforementioned flexible joint. The retaining ring 11 has an annular oil pocket 21 therein to which oil may be supplied by removing the plug 22.

For preventing leakage from the interior of the pipe 2, I have provided a novel type of segmentary disc such as is indicated at 23. This disc may have a flat base 24 which bears against the outer surface 25 of the flange 3 and a spherical surface 26 which engages a spherical depression 27 formed in the retaining ring 11. Lubricant may be supplied to the segmentary member through oil ports such as are indicated at 28.

I find that the disc like segment 23 may be made from a number of materials. I may use various resinous condensation products or I may use strongly compressed paper stock. I may further use metal or other compounds. It is important that the spherical depression 27 be accurately cut out as with the operation of the machine the spherical surface of the segment becomes highly polished and provides a leak proof joint.

In Patent #1,129,815, considerable difficulty was experienced due to too rapid wear of the spherical segment formed on the end of the outer pipe and when the spherical surface became worn, an entirely new piece had to be provided. My further improvement is the provision of a segment of different material than the pipe 2 which as noted, is preferably made of a resinous condensation product particularly if said condensation product is compressed in a series of laminations.

Having thus described my invention, what I claim as new and desire to secure by Letters Patent, is:—

A packing box for attachment to the flange of a rotary machine element to which fluid is to be supplied and fluid syphoned away, comprising a threaded nipple having a flat flanged outer face, a shoulder on said nipple, a thrust ball bearing assembly retained by said shoulder, a housing having a shoulder for retaining the other side of said bearing assembly, a smaller pipe extending through said nipple, another nipple having a supporting flange through which said smaller pipe extends, a housing mounted on said last noted nipple, said housing having a concave bearing portion, resilient means securing said housings together, a convex composition bearing received within the concave bearing portion of said second noted housing, having a flat face engaging the flat flanged outer face of the first noted nipple, a reducing T threaded on said second noted nipple, said smaller pipe threaded into the reduced threaded portion of said T, and said second noted nipple threadably engaging an unreduced threaded portion of said T.

JOHN H. REEDY.